United States Patent [19]
Hind

[11] 3,943,420
[45] Mar. 9, 1976

[54] ELECTRIC VEHICLES

[75] Inventor: Malcolm Arthur Hind, Abergavenny, Wales

[73] Assignee: Crompton Electricars Limited, Wales

[22] Filed: July 26, 1974

[21] Appl. No.: 492,250

[30] Foreign Application Priority Data
Aug. 17, 1973 United Kingdom............ 39016/73

[52] U.S. Cl. ............... 318/139; 318/403; 318/411; 180/65 R
[51] Int. Cl.² ........................................ H02P 5/16
[58] Field of Search .......... 318/139, 403, 411, 412; 180/65 R

[56] References Cited
UNITED STATES PATENTS

| | | | |
|---|---|---|---|
| 3,207,966 | 9/1965 | Parkinson | 318/139 |
| 3,223,908 | 12/1965 | Hutchinson et al. | 318/139 |
| 3,243,678 | 3/1966 | Frier | 318/412 X |
| 3,264,540 | 8/1966 | Dannettell | 318/412 X |
| 3,729,665 | 4/1973 | Tateo et al. | 318/139 |
| 3,761,793 | 9/1973 | Naito | 318/139 |

*Primary Examiner*—Gene Z. Rubinson
*Attorney, Agent, or Firm*—Rose & Edell

[57] ABSTRACT

A battery vehicle having a normal speed range for house to house deliveries and an extended speed range for lengthy journeys such as to and from delivery rounds. The extended speed range is engageable by operation of a manual range control. The manual range control is rendered inoperative on startup so that the extended speed range is not immediately available. After a delay, of predetermined period, or after a delay of predetermined period during which the speed has been held at, or above, a determined limit, or after the vehicle has covered a predetermined distance, the manual range change is enabled.

23 Claims, 5 Drawing Figures

ELECTRIC VEHICLES

BACKGROUND OF INVENTION

This invention relates to electric vehicles and to control circuits therefor. It particularly relates to road delivery vehicles.

It would be an advantage to provide higher road speeds than are currently available on electric delivery vehicles, particularly as now there is a tendency, with centralisation of supply, for the individual delivery round to become longer - it may extend up to ten miles or more from the depot. However, this results in a greater energy requirement and there is obviously a finite amount of energy available per trip, or between charges in the case of a battery-operated vehicle. Furthermore, if a driver is given a higher speed capability and he attempts to use it on every possible occcasion there will be frequent stoppings from high speed which is very wasteful of energy and the latter may not suffice to enable the round to be completed. In any case high speeds are not necessary when a vehicle is on a frequent stop-start run and do not materially affect the total delivery round time.

In one prior art arrangement the vehicle battery is in two sections. These sections are initially connected, by means of switches, so that they are in parallel across a series circuit comprising a rheostat controller and the drive motor. When the driver wishes to go faster than can be provided by this circuit arrangement the connections are switched so that the sections are connected in series. The speed is then regulated by means of a further rheostat connected in the series circuit. This arrangement permits the driver to select the higher speed range at any time and is therefore not satisfactory for delivery vehicles. The additional rheostat furthermore wastes energy.

In a further arrangement, which is similar to the previously mentioned one, diodes are connected in place of switches in series with the individual sections of the battery and these diodes become back-biassed when the batteries are switched to a series connection thus preventing short circuits on the batteries. This arrangement offers considerable economies but still allows the driver to select the higher speed range whenever it suits him.

It is an object of this invention to provide an electric battery powered vehicle having an extendable speed range which may be used only on relatively long journeys.

According to the present invention, there is provided an electric battery powered vehicle having both a variable speed controller and a manual range control for changing the speed range capability of the vehicle by at least one step, and further comprising a delay means which temporarily renders the manual range control inoperative when the vehicle starts so as to prevent the upper fraction of the speed range being available to the driver during short journeys such as occur with house to house deliveries. If, for example, it is impossible for the driver to achieve more than half speed for a period of, say, ten seconds, short distance house to house vehicle movements will perforce be made in the low speed mode, without the energy losses consequent upon frequent stopping from high speeds, and yet the higher speed capability will be available for longer distances.

In a preferred embodiment, the driver depresses a footswitch to accelerate the vehicle from rest in a fully controlled manner but during the first ten seconds, say, of travel the top speed is limited to half of the overall maximum speed. At the end of the timed period, a visual indication may be provided to the driver that maximum speed is now available but the vehicle does not accelerate beyond half speed unless the driver operates a control, e.g., a switch or button, for this purpose. When the high speed indication is showing and the driver's control is operated the vehicle accelerates under full control to maximum speed (and full power).

In both modes of operation of the preferred embodiment, the actual power supplied to the traction motor through the controller is under the control of the driver via the footswitch. However, it will be understood that, in the limited or half speed mode, there need not always be a restriction to half power in all cases because the vehicle may need more power to climb a steep gradient at low speed. But when the vehicle is travelling on level road, the half-speed mode will involve a limitation of the power available to that appropriate to maintain that speed.

As a further feature, attempts by the driver to operate the top speed button during the initial timed period may be arranged to cause the timer to reset and the timing period to recommence. This is expected to discourage undesirably early attempts to achieve the top speed mode. The timer may also be arranged to reset as a consequence of slowing down or stopping of the vehicle and this will prevent the driver from using his waiting period or some part of it during some short journeys so that on a later journey he may immediately assume a high speed operation.

DETAILED DESCRIPTION OF INVENTION

Figure 1:
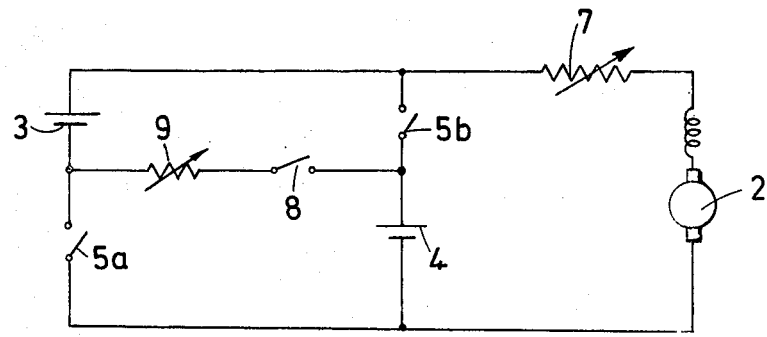
Figure 2:
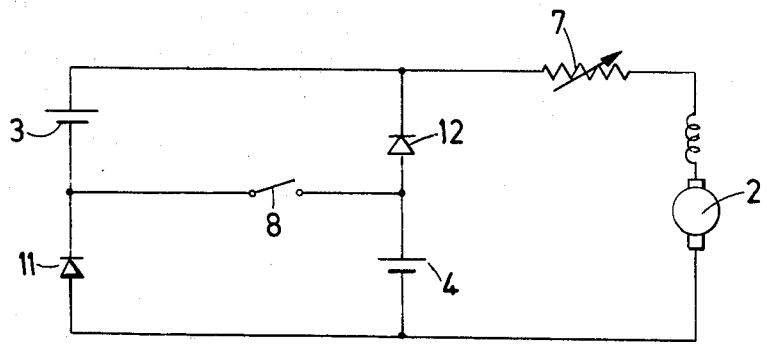
Figure 3:
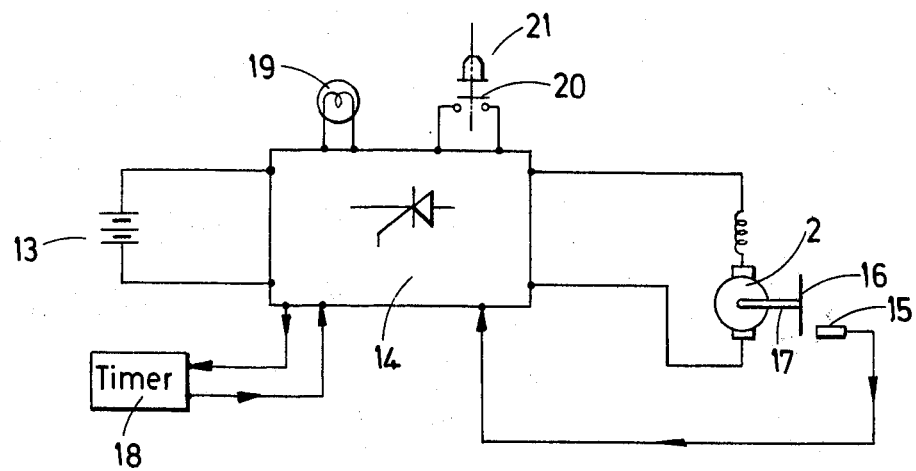
Figure 1A:
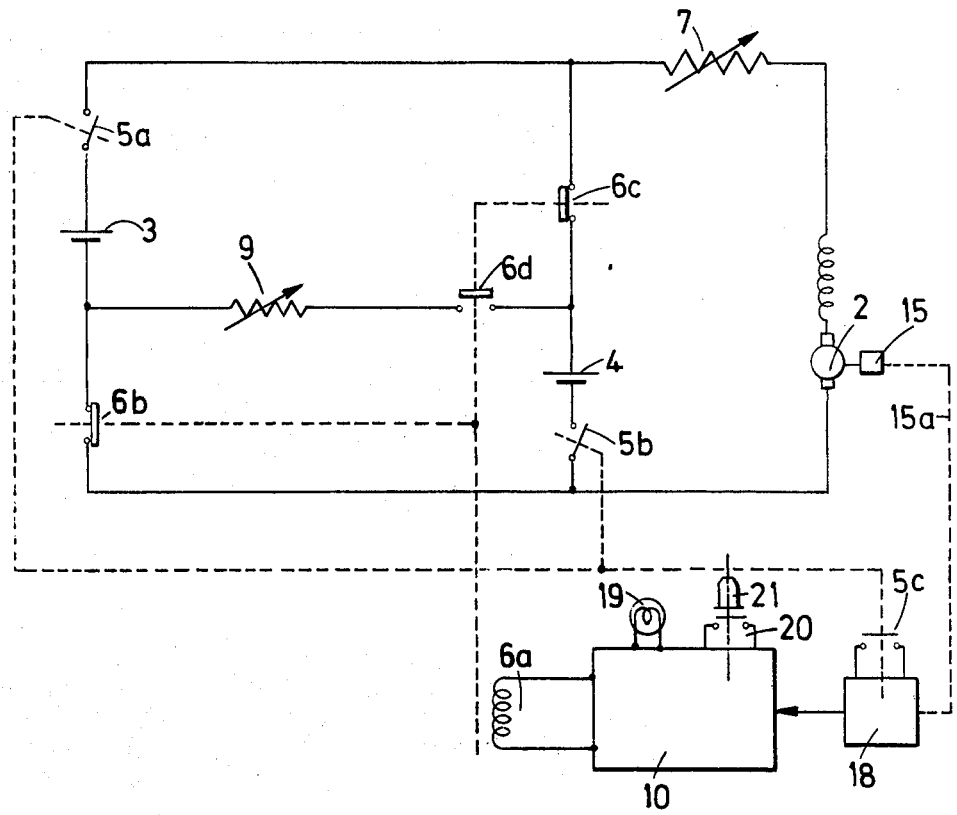
Figure 4:
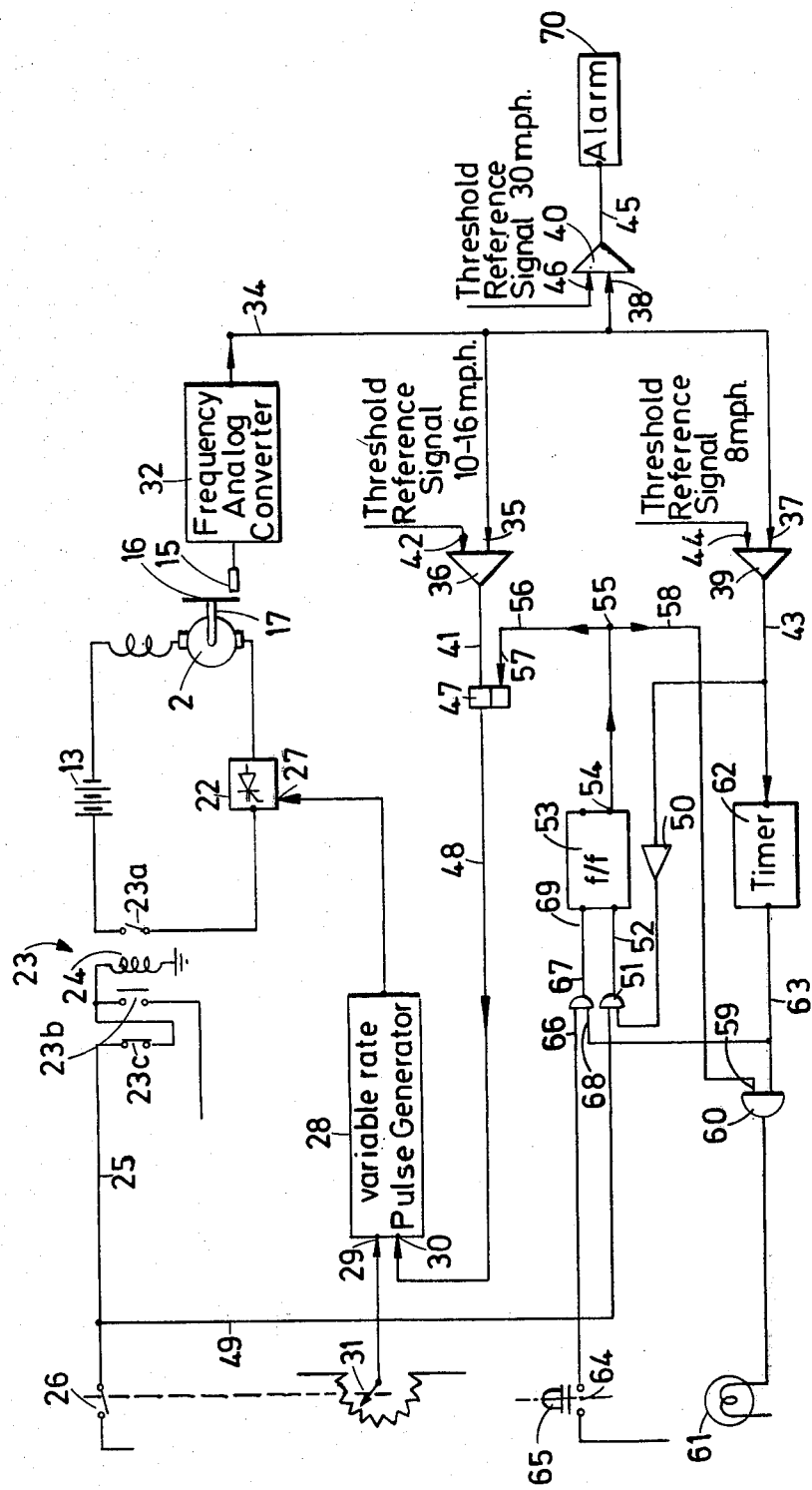

Other objects, features and advantages will occur from the following description of preferred embodiments and acompanying drawings in which:

FIG. 1 shows a relatively simple pre-art series-parallel controller for a traction motor, FIG. 1a shows the controller of FIG. 1 adapted to include the invention, FIG. 2 shows another form of series-parallel controller which may be adapted to include the invention in a similar manner to the arrangement shown in FIG. 1a, FIG. 3 shows a general schematic diagram of a control system incorporating the invention using a single battery, and FIG. 4 shows a detailed schematic diagram of a modified form of the control system shown in FIG. 3.

In the prior art controller for the traction motor 2 of an electric vehicle shown in FIG. 1 the electrical storage battery is divided into two equal parts 3 and 4, which are initially switched in parallel by closing switches 5a and 5b together. The vehicle speed may be regulated by adjustment of variable resistor 7 which resistor is controlled from the driver's footswitch. The resistor 7 could, for example, be a carbon pile regulator. When the speed of the vehicle has built up sufficiently, switches 5a and 5b may be opened and switch 8 closed. Operation of these switches will then put battery sections 3 and 4 into series and the vehicle speed can be further increased by adjustment of a regulator 9. The invention provides enabling means, as shown in FIG. 1a, whereby the change-over of the connections of the battery sections from a parallel to a series arrangement cannot be effected until an indication signal occurs.

The circuit of FIG. 1a is similar to that of FIG. 1 except that the switches 5a, 5b of FIG. 1 become isolating switches and the change-over function is now provided by contacts 6b, 6c and 6d operated by a relay 6a under the control of controller 10. When the driver wishes to start his vehicle he must first close isolating switches 5a, 5b. These are ganged with contacts 5c which, when they close, operate delay means 18. The latter defines a delay, lasting about ten seconds, at the end of which a signal is fed to controller 10 which is then enabled. Lamp 19 provides an indication to the driver at the end of the delay that he may engage the extended speed range. To proceed at a faster speed the driver depresses operator 21 which closes contacts 20 and causes the controller to energise the relay 6a. As a consequence contacts 6b and 6c open and contacts 6d close, thereby connecting the battery sections in series. Until the control is enabled by the signal from the delay means 18, prior closing of contacts 20 will be ineffective, relay 6a remaining de-energised. Delay device 18 may be a timer which provides a prescribed delay period. Alternatively, delay device 18 may be responsive to a displacement signal provided by displacement means 15 over connection 15a whereby the enabling of controller 10 is delayed until the vehicle has covered a predetermined distance from startup.

The prior art controller shown in FIG. 2 achieves parallel series switching of the two sections of the battery 3, 4 by using diodes 11 and 12 in place of the switches 5a and 5b of FIG. 1, which diodes are back-biassed when switch 8 is closed. Switch 8 connects the two parts of the batteries in series. The circuit may be adapted to incorporate the invention by replacing manual switch 8 with relay operated contacts and control means similar to the controller 10 and the delay means 18 shown in the arrangement of FIG. 1a. Likewise, displacement means 15 may be fitted to provide a displacement signal to the delay means 18.

So far, I have described circuits that effectively reduce the voltage applied to the drive motor during the initial progress of the vehicle and have referred to the use of a time delay or distance indicator that allows selection of top speed after a predetermined time or distance has been run. In the case of the circuits already described, there will be little point in using a vehicle speed, e.g. maintained for a preset period, as an indication of when to permit a change to top speed, since with reduced voltage supplied to the motor it is probable that the vehicle will not be able to achieve the preset speed in the low speed condition on gradients.

In the case of the control system shown in FIG. 3 the storage battery 13 is not divided into separate parts as in the other schemes, but speed control and the regulation of the power supply to the motor 2 is provided by a solid state controller (thyristor chopper) 14. This type of circuitry is known to provide efficient speed control on an electric vehicle. The actual power taken from the battery and supplied to the motor is controlled by varying the pulsing rate of the chopper controller, such pulsing rate being determined by the position of the driver's foot on the accelerator pedal of the vehicle except initially upon starting the vehicle when an in-built ramp function controls the pulsing rate of the controller to prevent excessive acceleration.

In addition to this, a signal representative of the rotational speed of the motor, and hence the vehicle speed, is continuously fed back to the solid state controller by a magnetic sensor head 15 coupled to a toothed or apertured disc 16 on the output shaft 17 of the motor. A standard tachogenerator could also be used for this purpose. An electronic timing circuit 18 is also coupled to the solid state controller 14.

On the driver initially depressing the foot pedal the vehicle accelerates away from rest and the timing circuit 18 commences to measure elapsed time. During the timing period, should the actual speed of the vehicle, as indicated by the feedback signal, attempt to exceed the predetermined lower value, the pulsing rate of the solid state controller will be automatically reduced irrespective of the demands made by the driver at the foot pedal. This condition will continue until the preset time period has elapsed on the timer, as indicated by a lamp 19, whereafter it will be possible for the driver to select the higher speed condition by pressing a push button switch 20 and effectively override the speed signal feedback circuit.

The elapsing of the fixed time period is signalled to the driver by the lighting of a lamp 19. It is left to the driver to press the push button 21 of switch 20 if he wishes to obtain a higher speed from the vehicle. Should this high speed button be depressed before the timing period is elapsed, then it will cause no action.

A modified form of the system of FIG. 3 utilising a logic circuit to control the operation of a thyristor chopper is shown in detail in FIG. 4, wherein devices having the same function as in the system of FIG. 3 are given identical reference numbers.

A conventional series d.c. motor 2 is connected in series with a thyristor chopper controller 22, contacts 23a of an isolating contactor 23 and a traction battery 13. The isolating contactor contacts 23a are operated by energising contactor coil 24. The latter is connected via a line 25 over normally closed contacts 23c to a normally open set of contacts 26 conveniently provided by a micro switch, which are operated by the accelerator pedal of the vehicle (not shown). These contacts are momentarily closed during the first few percent of the accelerator pedal traverse causing the contactor 23 to draw in. Contacts 23c open when the contactor 23 is energised thus isolating the contactor from the logic circuit. A holding circuit is provided for the contactor via contacts 23b.

Upon energisation, the controller 22 provides a succession of substantially constant duration periods during which current may flow from the battery to the motor. The rate at which these periods occur is governed by the rate at which pulses are delivered to a control input 27. These pulses are provided by a variable rate pulse generator 28 which has inputs 29 and 30. Input 29 is connected to receive a voltage tapped from a variable potentiometer 31 the setting of which is controlled by the accelerator pedal. As the pedal is depressed the voltage on input 29 increases. In an alternative arrangement (not shown) the same effect is produced by varying the mark space ratio. Obviously in other alternative arrangements both pulse rate and mark space ratio may vary.

An apertured disc 16, of magnetic material, is mounted upon the output shaft 17 of motor 2. A perception head 15 detects rotary movement of this disc and provides an alternating current signal output the frequency of which is proportional to the speed of the motor and hence the vehicle speed. A frequency to analog converter 32 receives this square wave signal and converts it into a d.c. voltage.

A line 34 connects to the output of the converter 32 also to an input 35 of a threshold amplifier 36 and to the inputs 37 and 38 of level detectors 39 and 40. Threshold amplifier 36 provides an analog output on line 41 when the voltage on input 35 exceeds a reference voltage, called a threshold reference signal, on input 42. Level detector 39 provides a high level logical signal on line 43 when the voltage on input 37 exceeds a second reference voltage, also called a threshold reference signal, on input 44. Level detector 40 provides a high level logical signal on line 45 when the voltage on input 38 exceeds a third reference voltage, likewise called a threshold reference signal, on input 46.

The analog signal on line 41 passes through a gate 47 and is fed via line 48 to an input 30 of generator 28. Disc 16, head 15, converter 32, line 34, amplifier 36, lines 41 and 48 constitute a negative feed back loop the signal on which opposes the input from the potentiometer 31.

The output of level detector 39 is always either high or low. The low level output is complemented in inverter 50 and is fed to one input of an AND gate 51. The output of gate 51 is fed to the reset input 52 of a flip-flop 53. A second input to AND gate 51 is connected to the line 49. Flip-flop 53 is therefore put in a reset condition when the accelerator pedal is initially depressed. A high level output 54, corresponding to the reset condition of flip-flop 53 is fed to a junction 55. A line 56 connects junction 55 to an enabling input 57 of gate 47. The high level signal on input 57 opens gate 47 and allows the analog signal on line 41 to pass through to line 48. A low level signal on input 57 closes the gate 47 and breaks the said negative feed back loop. The high level signal on junction 55 is also fed via line 58 to an enabling input 59 of AND gate 60. The output of AND gate 60 energises lamp 61. Line 43 feeds the output of level detector 39 to a timer 62 which commences a timing period in response to a high level signal input. Timer 62 provides a high level signal on line 63 upon completion of the timing period provided it has received a continuous high level input during the timing period. Line 63 forms a second enabling input 64 to AND gate 60. When the timer 62 times-out lamp 61 becomes illuminated.

A set of contacts 64, having a manual push-button 65, when closed provide a high level signal to an enabling input 66 of an AND gate 67. A second enabling input 68 to gate 67 is provided by the high level output of timer 62. The output of gate 67 is connected to the set input 69 of flip-flop 53. It will be seen that the latter controls the state of the gate 47 and constitutes a memory therefor. Flip-flop 53 will not permit a change in the mode of operation of the electric vehicle until certain conditions are detected by the logic circuit just described.

Line 45 connects the output of level detector 40 to an audible alarm 70. Alarm 70 operates when a high level signal appears in line 45. Detector 40 and alarm 70 do not constitute part of the logic system controlling the operation of controller 22 and therefore may be omitted from the circuit without affecting its operation.

The operation of the system is described hereinafter. At rest coil 24 is de-energised, hence the motor 2 is isolated from the battery 13. When the driver wishes to proceed he depresses the accelerator pedal which has the immediate effect of momentarily closing contacts 26 which in turn causes contactor 23 to draw in. Further depression of the accelerator pedal alters the setting of potentiometer 31 which then provides a voltage signal to input 29 of the variable rate pulse generator 28. The latter commences to generate pulses which causes the controller 22 to supply bursts of power to the motor 2. As the motor rotates an alternating current signal is generated by the magnetic perception head. This signal is converted to an analog signal representative of frequency (hence speed of rotation of the motor, and hence vehicle road speed) in converter 32 and applied to line 34. Within the generator 28 delay means prevents an immediate full response of the generator to a large input signal from the potentiometer 31, thereby limiting the power supply to the motor 2 at any instant. Eventually, however, the motor reaches a speed corresponding to the setting on the potentiometer.

This mode of operation will exist whenever the speed of the vehicle is less than the value corresponding to the magnitude of the threshold reference signal 42 applied to amplifier 36. In the present embodiment this threshold is set to a value corresponding to speeds within the limits of 10 to 16 mph.

Assume now the driver operates his vehicle under normal loading conditions at a speed in excess of the limit set by the threshold reference signal 42 but does not place the vehicle into its second, or fast, mode of operation. Upon depression of the accelerator pedal the repetition rate of the pulses provided by the generator 28 increases thus causing more power to be supplied to the motor, the motor speed increases and the magnetic perception head 15 provides a higher frequency input to the converter 32. At the output of the converter the analog signal increases in magnitude until it rises above the value of the threshold reference signal 42. At this point amplifier 36 switches on and a negative feedback signal is provided on line 41 which now increases with an increasing magnitude of the input signal on line 34. Gate 47, being normally open at this time, passes the signal via line 48 to the input 30 of the generator 28. The negative feedback has the effect of forcing a balance between the accelerator setting and the power supplied to the motor such that the motor runs at a lower speed than it would otherwise do. As the speed rises above the threshold of amplifier 36 the feedback increases and eventually speed limitation effectively occurs, any further increase of speed thereafter resulting in the power being withdrawn from the motor. The point at which this speed limitation is imposed is determined by the gain of the amplifier 36 and the magnitude of the threshold reference signal 42. Preferably amplifier 36 has a non-linear characteristic such that its output increases slowly at first for a small increase of the input above the threshold but increases more steeply as the input rises towards its maximum value.

When the speed of the vehicle falls, control thereof via the accelerator pedal is restored to the driver, irrespective of the actual setting of the pedal. Hence, under heavy loading conditions, for example during hill climbing, the full battery power becomes available to propel the vehicle.

The second, or fast, mode of operation of the vehicle is effected by switching out the negative feedback, i.e. by opening gate 47. This gate is normally locked on by means of the logic circuit constituted by the level detector 39, flip-flop 53, timer 62 and the associated AND gates 51, 59, 67 to prevent selection of the fast speed mode of operation during short journeys. For this purpose, during operation of the vehicle in its low speed mode, a high level gate control signal for gate 47 is provided on line 56 by flip-flop 53, the latter being in its reset state. Flip-flop 53 is automatically switched into this state whenever the accelerator pedal is depressed through the first part of its travel and there is a coincident low level signal on line 43, contacts 26 being thereby momentarily closed. This arrangement, as will be apparent, permits the driver to retain the fast speed facility even though he may take his foot from the pedal, as when slowing up in traffic.

When the speed of the vehicle rises above the threshold corresponding to the threshold reference signal 44, which in our present example is set to correspond to about 8 mph, level detector 39 provides a high level output on line 43. This signal resets timer 62 which in turn now commences a timing period. At the conclusion of the predetermined period the output of the timer on line 63 becomes a high level output. This signal passes through gate 60, the latter being enabled by the existing high level signal at the output of the flip-flop 53, and serves to energise lamp 61. At time point in time the driver has available the high speed capability of his vehicle. Should he not choose to use it, the capability will remain so long as the speed of the vehicle does not fall below the threshold of level detector 39. However, if he stops or slows down below this threshold, then the timer 62 automatically resets and does not recommence its timing operation until a high level signal is once again provided on line 43.

Lamp 61 is arranged to provide a visual indication to the driver that the high speed capability is available. Adjacent to the lamp, or even combined with it, there is provided a manual push button 65 pressure on which causes the making of contacts 64 thereby providing a high level signal at the enabling input 66 of gate 67. The other enabling input, 68 is connected to the output of the timer 62, which timer provides a high level signal at this time. Hence the high level signal provided by the contact 64 passes to the said input 69 of flip-flop 53 thereby causing the latter to change to its set state. In response to the change in state of the flip-flop 53 the output 54 provides a low level signal at junction 55. This low level signal, transmitted through line 56, closes the gate 47 thereby removing the negative feedback provided on line 48. Simultaneously the low level signal on line 58 disables gate 60 and thereby removes the energising high level signal supplied to lamp 59 the illumination of which is then extinguished. With the removal of the negative feedback the speed of the vehicle may now continue to rise, dependent upon the setting of the accelerator pedal, through its full range. The capability of operating within this range without having to wait for the recycling of the timer 62 will prevail as long as the accelerator pedal is not released.

Should the accelerator pedal be released and the speed of the vehicle falls below the threshold of level detector 39 then gate 51 is pulsed by the contacts 26 at the same time that a low level signal appears on line 43. This low level signal provides, via inverter 50, an enabling input to gate 51. The output from gate 51 resets flip-flop 53 to produce a high level signal on enabling input 57 of gate 47. This high level signal opens the gate 47 and restores the negative feedback to junction 49. In order to restore the fast speed capability after flip-flop 53 has been reset, it is necessary once again to recycle timer 62 and wait until the lamp 59 illuminates. Previous operation of the push button 65 will have no effect, since the low level signal on enabling input 68 of gate 67 disables the latter and prevents a high level signal being fed to the set input of the flip-flop 53.

As has been remarked earlier, timer 62 automatically resets, whether it is in the middle of its timing operation or has already timed out, whenever the signal on line 43 switches to a low level, and if the vehicle is in the low speed mode of operation the driver then has to wait for the full timing period before he can reselect the high speed mode of operation. This arrangement debars the driver from saving up increments of the waiting time during a succession of previous short journeys for use in achieving a rapid getaway on other short journeys and it also prevents him from storing up the waiting time whilst waiting, for example, for the lights to change at traffic signals. On reasonably long journeys, however, the initial waiting period will not introduce any significant delay and he can slow down, as for example during traffic manoeuvres, without necessarily losing the instant high speed capabiltiy. Commercially available timers have a reset input which may optionally be used to bring about a resetting of the timer during the first mode of operation. For sxample, this reset input may be connected to the output of a one-shot device (not shown) which is connected through an additional set of contacts (also not shown), under the control of the push button 65, to a suitable triggering potential source so that the timer is always reset when the button 65 is pressed. During the first mode of operation resetting of the timer will delay the instant at which the fast speed mode can be engaged and hence the driver will be positively discouraged from pressing the button before the capability is there. Once this capability is present then the delay provided by the one-shot device enables the flip-flop 53 to set before a reset pulse reaches the reset input of the timer thus removing the enabling input on gate 67 as the timer resets. Flip-flop 53 will therefore remain set once the second mode of operation is established and be insensitive to the resetting of the timer so long as the speed of the vehicle is maintained above the 8 mph threshold.

Level detector 40 is responsive only to signals on line 34 which represents speeds in excess of some predetermined maximum value. The limit is set by adjusting the value of the reference threshold signal 46. In the present example the speed limit is set to 30 mph. When this speed is exceeded a high level signal at the output of the level detector 40 operates the alarm 70.

In the preferred embodiment gate 47 is arranged to have a slow progressive turn-off characteristic to prevent a sudden removal of the negative feedback on line 48. The characteristic prevents current surges being fed to the motor.

It will be appreciated by those skilled in the art that the logic circuit used to control the gate 47 may take forms other than those disclosed in this description. The description is provided merely by way of example and all circuits which are effective to control the operation of the thyristor controller 22 and in particular the opening of the gate 57, to produce the vehicle operating facility as set out in the claims attached hereto are considered within the ambit of this invention. In particular normal negative feedback, in addition to the switched feedback, may be provided so that, during normal progress, and except at the limits of the low speed mode, the speed of the vehicle is rendered always a direct function of the accelerator control setting.

In addition, the isolating switches, or start switches, and the variable speed controllers referred to in connection with the various embodiments described herein may have either a common operator or separated operators as is well known in the art and the operator (or operators) may be hand or foot actuated; such arrangements all come within the ambit of the expression start-/variable speed controller used in the succeeding claims. The manual operators provided for the range change facilities may also be foot actuated.

The embodiments of the invention in which an exclusive property or right is claimed are defined as follows:

1. An electric battery powered vehicle comprising:
   a start/variable speed controller;
   manual speed range means for changing the speed range capability of the vehicle by at least one step;
   an electric drive motor responsive to the setting of said start/variable speed controller and said manual speed range means to provide the desired speed of operation;
   said manual speed range means including a settable manual operation and control means responsive to the setting of said manual operator for expanding the range of drive voltages applied to said drive motor by said at least one step;
   wherein said control means includes delay means operative to temporarily render said control means non-responsive to the actuation of said operator upon startup of the vehicle so as to prevent the upper fraction of the speed range being available to the driver during short journeys such as occur with house to house deliveries.

2. A vehicle according to claim 1 wherein said control means further comprises displacement transducer means connected to the said delay means for providing a signal thereto when the vehicle has traversed a predetermined distance from its startup position, said delay means being responsive to said signal to enable said control means to respond to actuation of the manual operator.

3. A vehicle according to claim 1 wherein said delay means comprises a timer operatively coupled to the said start/variable speed controller so as to having a timing cycle initiated when the said controller is moved from a non-driving to a driving position.

4. In an electric vehicle, traction means comprising:
   a. a battery-operated drive motor;
   b. first and second batteries;
   c. switching means for connecting the first and second batteries each in parallel with the motor in a first state of the switch means and for connecting the first and second batteries each in series with the motor in a second state thereof;
   d. a start/variable speed controller in series with said batteries and said motor;
   e. control means having a manual operator and including means for operating the said switching means; and
   f. delay means connected to the said control means for temporarily disabling the said control means upon startup of the vehicle so as to delay the operation of the switching means and thus prevent the upper fraction of the speed range being available to the driver during short journeys such as occur with house to house deliveries.

5. Traction means according to claim 4 further comprising displacement transducer means coupled to the said drive motor and connected to the said delay means for providing a signal thereto when the said vehicle has traversed a predetermined distance from startup.

6. Traction means according to claim 4 wherein said delay means comprises a timer which is coupled to the said start/variable speed controller so as to have a timing cycle initiated when the said controller is moved from a non-driving to a driving position.

7. Traction means according to claim 4 wherein the said two batteries are connected in series via a first normally open switch which is initially locked out by said control means and are connected in parallel through a pair of normally closed switches which are open circuited when the said first switch is closed.

8. Traction means according to claim 4 wherein the said two batteries are connected in series via a first normally open switch which is initially locked out by the said control means, and the batteries are connected in parallel via rectifiers which are back-biassed when the said first switch is closed.

9. In an electric battery powered vehicle having a start/variable speed controller and a manual speed range facility for changing the speed range capability of the vehicle by at least one step, a solid state controller comprising:
   a. a pulse rate generator, having a first input connected to the variable speed controller;
   b. a thyristor chopper which receives pulses from the pulse rate generator and delivers pulses of direct current to the vehicle drive at a rate dependent upon the pulse rate of the said pulse rate generator;
   c. a manual operator for selecting a wider speed range;
   d. velocity feedback means connected via a feedback loop to a second input of the said pulse rate generator for limiting the rate at which current pulses are supplied thereby so that the speed of the vehicle corresponds with the setting of the variable speed controller; and
   e. delay means which, after a short period of operation of the vehicle from startup, and upon operation of the said manual operator, disconnects the velocity feedback from the solid state controller.

10. A solid state controller according to claim 9 wherein the delay means comprises timing means.

11. A solid state controller according to claim 10 further comprising a first level detector which has a first input connected to receive a reference signal from a first reference potential source, a second input connected to receive the velocity feedback signal and an output connected to the said timing means to provide an enabling signal thereto initiating a timing cycle when the magnitude of the velocity feedback signal exceeds the value of the reference signal, the said timing means providing a disabling output signal at the end of its timing cycle which disconnects the velocity feedback signal from the pulse rate generator.

12. A solid state controller according to claim 11 comprising a memory means, a first gate having a first input provided by the said manual operator when the latter is actuauted and an output connected to an input of the memory means, a controlled switch having a main conductive path which is connected in series with the said feedback loop and a control input connected to the output of the memory means, said switch being held in its conductive condition by an enabling signal provided by the memory means when the latter is in a first state, said timing means having an output connected to the second input of said first gate and providing an enabling signal thereto at the end of its period which, subject to the provision of a signal from the said manual operator, causes the memory means to change to a second state in which it provides a disabling signal to the control input of the said controlled switch, thereby rendering the latter non-conductive.

13. A solid state controller according to claim 12 further comprising an indicating lamp and a second gate having an output connected to the said indicating lamp, a first input connected to the output of the said timing means and a second input connected to the output of the said memory means, said second gate being enabled when the timing means reaches the end of its period and the said memory means is in its first state, thereby energising the said indicating lamp.

14. A solid state controller according to claim 12 wherein the said memory means has a second input which is connected to the output of the said first level detector via a third gate connected in series with an inverter and wherein the signal provided at the said second input when the velocity feedback signal falls below the value of the reference signal causes the memory means to assume its first state.

15. A solid state controller according to claim 14 wherein said timing means is adapted to reset whenever the output of the said level detector corresponds to a condition in which the velocity feedback signal is less than the said reference signal.

16. A solid state controller according to claim 14 wherein the third gate has a conditioning input which is connected to the vehicle start controller.

17. A solid state controller according to calim 14 wherein the memory means comprises a flip-flop which in its reset state provides a high level signal to the control input of the said controlled switch to cause the latter to be conductive and in its set state provides a low level signal to the said controlled switch causing the controlled switch to be non-conductive.

18. A solid state controller according to claim 12 further comprising a threshold amplifier connected in the negative feedback loop in series with the controlled switch, said threshold amplifier having a first input connected to the velocity feedback means and a second input connected to receive a reference signal from a second reference potential source, said reference signal being higher in value than the signal provided by the first reference potential source.

19. A solid state controller according to claim 18 wherein the said threshold amplifier has a non-linear transfer characteristic, there being a smaller change of the output thereof for changes in low level input signals as compared with the change produced at the output for changes in high level input signals.

20. A solid state controller according to claim 18 further comprising warning means and a second level detector having a first input connected to receive the velocity feedback signal and a second input connected to receive a reference signal derived from a third reference potential source, the said reference signal being of higher magnitude than the reference signal provided at the second input of the said threshold amplifier and an output connected to the said warning means whereby an alarm signal is provided when the speed of the vehicle rises above a predetermined maximum.

21. A solid state controller according to claim 9 wherein said velocity feedback means comprises an apertured disc coupled to the drive motor of the vehicle for rotation therewith, a magnetic perception head arrannged in a functional relationship with the said apertured disc and a frequency-to-analog converter which is coupled to receive the signal provided by the magnetic perception head and provide an analog output signal representative of the speed of the motor.

22. An electric vehicle according to claim 12 wherein said timer has a reset input and further comprising resetting signal generating means responsive to the operation of the said manual operator before the expiry of said timing cycle for providing a reset input to said timer thereby causing a restarting of the timing cycle.

23. An electric vehicle according to claim 22 wherein said resetting signal generating means comprises a one-shot device having its output connected to the reset input of the timer and having an input connected to energising contacts which are operated by said manual operator, said one-shot device delaying the resetting of the timer with respect to the operation of said manual operator so that when engaging the second mode of operation following the completion of a timing cycle the memory is placed into its said second state before the said timer resets in response to the said reset input.

* * * * *